United States Patent [19]
Schoofs et al.

[11] 4,026,821
[45] May 31, 1977

[54] CATALYST REGENERATION

[75] Inventors: Richard J. Schoofs, Moraga, Calif.;
**Lloyd J. Nordhausen; Lee A.
Dugdale,** both of Grand Junction,
Colombia

[73] Assignee: Catco Venture, Moraga, Calif.

[22] Filed: May 10, 1976

[21] Appl. No.: 684,559

[52] U.S. Cl. .............................. 252/419; 23/286;
23/288 B; 34/135; 208/112; 208/113;
208/140; 208/216; 432/118; 242/418
[51] Int. Cl.² ................... B01J 23/94; B01J 23/92;
B01J 23/96
[58] Field of Search ................. 252/416, 418, 419;
23/286, 288 B; 34/135; 432/118; 208/176,
216

[56] References Cited
UNITED STATES PATENTS

| | | | |
|---|---|---|---|
| 1,709,456 | 4/1929 | Bojner et al. | 432/118 |
| 2,388,642 | 11/1945 | Ostergaard | 252/418 |
| 3,533,960 | 10/1970 | Weinert | 252/416 |
| 3,764,558 | 10/1973 | Tse et al. | 252/419 |

*Primary Examiner*—Winston A. Douglas
*Assistant Examiner*—P. E. Konopka

[57] ABSTRACT

A process for reactivating or regenerating catalysts which have become inactivated due to accumulation of carbon deposits or sulfur-containing carbon deposits on the catalyst surface during the course of use in catalytically refining various petroleum oils is described. Pursuant to the process, spent catalyst is passed into a regeneration zone comprised of a slowly rotating elongated generally cylindrical shell having its inlet at a level above its outlet end and having overlapping tangential louvers attached to the interior of the shell to support the catalyst, hot gas having an oxygen content in the range about 14 to 21 percent by volume is passed into the space between the louvers and the shell so that it passes between the louvers and through the catalyst supported on the louvers, catalyst is withdrawn from the space enclosed by the louvers at the outlet end of the shell at a rate adapted to maintain an average catalyst residence time of at least ½ hour in the regeneration zone, the hot gas is introduced at a rate such that from about 15 to 75 pounds per hour of hot gas are introduced for each pound of catalyst contained in the regeneration zone and the temperature of the hot gas introduced into the regeneration zone is adjusted so as to maintain a temperature in the range 600° to 900° F. in the gaseous effluent from the regeneration zone.

2 Claims, 2 Drawing Figures

CATALYST REGENERATION

BACKGROUND OF THE INVENTION

A number of catalytic processes are employed in the petroleum industry for the purpose of converting crude petroleum to a variety of products having physical and chemical properties which make them suitable for use by consumers. Among the refining processes involving the use of catalysts are cracking, hydrocracking, hydrodesulfurization, hydrodenitrification and reforming. In these and other refining processes where catalysts are employed, the catalysts decline in activity during the course of use as a result, in major part, of accumulation of carbonaceous matter commonly containing hydrogen and sulfur on the catalyst surface and in the catalyst pores. A number of catalysts used in a number of processes lose activity rapidly during the course of use and ordinarily the plants in which such catalysts are employed have provision for regeneration of the catalyst either in the reaction vessel itself or in an adjacent regenerator vessel to which the catalyst is transferred continuously as it is used. A number of catalysts, however, are used for extended periods before they become deactivated and continue to be effective until the buildup of carbonaceous material on the catalyst is very high. Onstream periods of months, or even years, are observed in some of the processes. In these cases, the refining units do not ordinarily include provision for catalyst regeneration and the refiner simply discards the catalyst when it has completely lost activity and replaces it with a new charge or the catalyst may be removed from the refining unit and regenerated in a regeneration unit which is neither attached nor related to the refining unit from which the catalyst is taken.

Catalysts containing cobalt, nickel, tungsten, molybdenum, or mixtures of two or more of these metals supported on a conventional support such as alumina, are commonly employed in hydrodesulfurization of various petroleum streams, hydrodenitrification of such streams and in hydrocracking high boiling petroleum streams which are previously treated to reduce sulfur and nitrogen contents. These catalysts are commonly used for extended periods before they become so deactivated by accumulation of carbonaceous deposits that they must be replaced. Theoretically, these catalysts can be regenerated by burning the carbonaceous deposits from the catalysts' surfaces and so restoring catalyst activity to a level about 90 percent of the activity of a fresh catalyst charge. Heretofore, no great amount of these catalysts have been regenerated because of difficulties experienced in the course of the regenerating procedures applied. Commonly, it is attempted to regenerate these catalysts in fixed beds by passing hot gas having a very low oxygen content through the bed to burn the carbonaceous material from the catalyst. Hot spots commonly develop in the fixed beds with resultant sintering of the catalyst and formation of large catalyst clinkers. It has also been proposed to regenerate these catalysts by passing them through a rotating kiln similar to a cement kiln and in this method considerable attrition of the catalyst by breakage and poor contact of the regeneration gas with the catalyst surface leads to low catalyst recovery and to a rather poor level of reactivation.

The present invention provides a means for regenerating heavily contaminated catalysts and obtaining high yield of highly reactivated material. The cost of reactivating these catalysts pursuant to the present invention does not ordinarily exceed about one-fourth of the cost of fresh catalyst and this cost includes transportation charges.

BRIEF DESCRIPTION OF THE INVENTION

Pursuant to the present invention, a regeneration zone is established which is an elongated, generally cylindrical shell having overlapping tangential louvers attached to the interior of the shell to serve as a support for the catalyst and hold it away from direct contact with the shell. The catalyst inlet to the cylindrical regeneration zone is at a level above the outlet from the zone, i.e., the regeneration zone slopes downwardly from inlet end to outlet end.

The cylindrical shell is slowly rotated, i.e., at a rate usually in the range 0.5 to 5 r.p.m. Spent catalyst is passed into the inlet or upper end of the shell and comes to rest on the overlapping tangential louvers which in practical effect constitute the inner wall of a double walled vessel. Hot gas having an oxygen content in the range about 14 to 21 percent by volume is passed into the space between the shell and the louvers at the bottom of the cylindrical shell so that it passes between the louvers and through the catalyst supported on them. Catalyst is withdrawn at the outlet end of the regenerator at a rate adapted to maintain an average residence time for the catalyst in the regeneration zone of at least ½ hour and ordinarily in the range 1 to 6 hours. The rate of introduction of the hot gas is such that from about 15 to 75 pounds per hour of hot gas are passed into the regeneration zone for each pound of catalyst residing in the regeneration zone at the time. The temperature of the hot gas at the inlet is adjusted by varying the proportions of air and natural gas burned in it so that the temperature of the gas leaving the regeneration zone is maintained in the range about 600° to 900° F.

When the spent catalyst has a high sulfur content in the carbonaceous deposits which have deactivated it, it is preferred to subject the catalyst to a two-step treatment, the first step being conducted at low temperature, i.e., controlling the temperature of the outlet gas from the regeneration zone to a level below about 700° F. and in the range about 400°–700° F. The low temperature suppresses the sulfation of the metals on the catalyst support. Significant sulfation precludes recovery of a high level of activity in the regenerated catalyst. After the sulfur removal step is completed, the catalyst is again passed through the regeneration zone at a more elevated temperature such that the temperature of the outlet gas from the regeneration zone is kept in the range about 700° to 900° F., this step serving to remove carbon relatively completely which cannot be accomplished in a reasonable time at significantly lower temperature.

Catalysts comprised of one or more metals from Group VIb, VIIb and VIII supported on a rugged porous support such as alumina respond particularly to the above-described method of regeneration.

DETAILED DESCRIPTION OF THE INVENTION

The process is described with reference to the appended drawings in which.

Figures 1, 2:
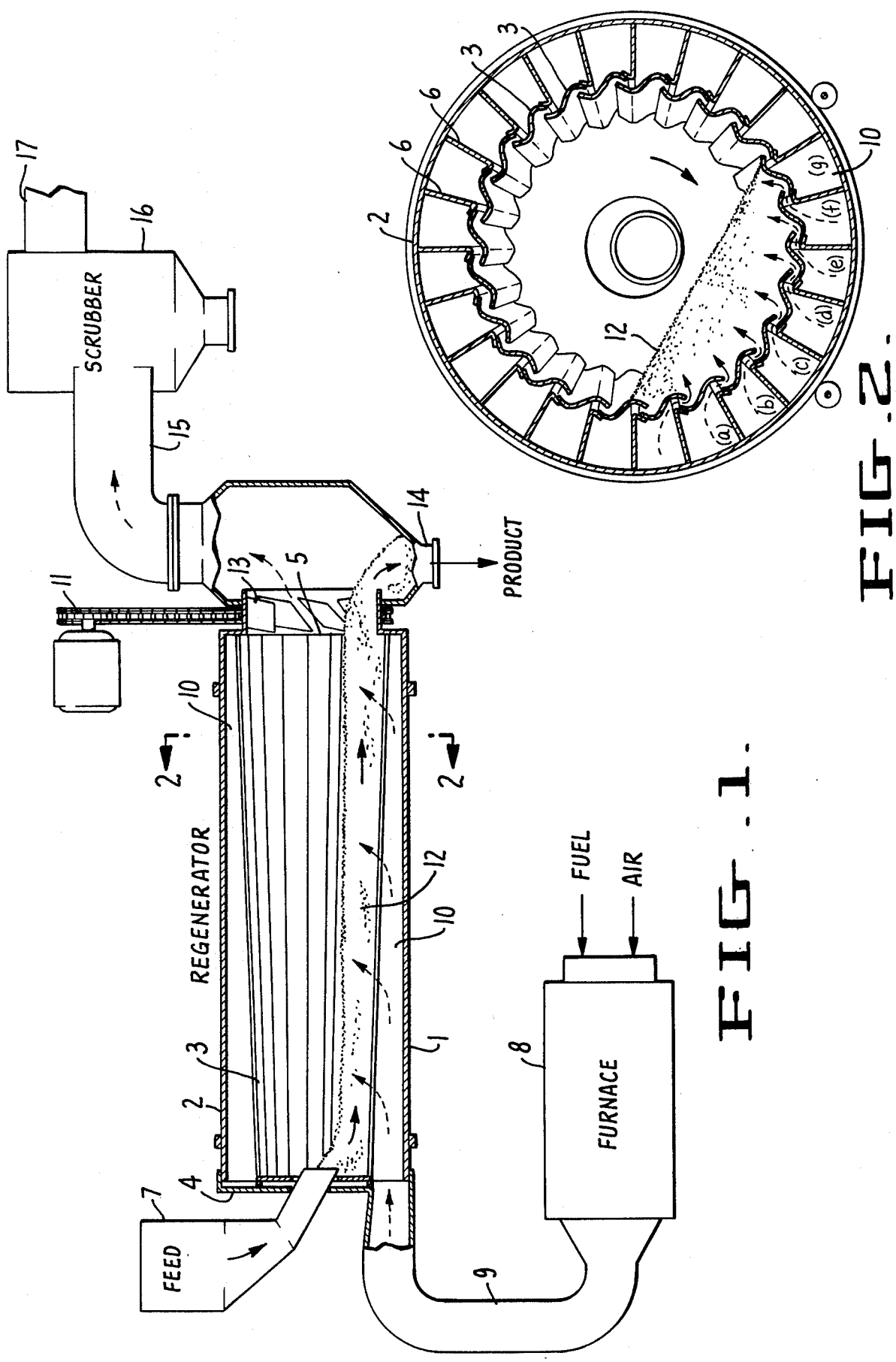
FIG. 1 is a cross-section of the regenerator and shows auxiliary equipment.
FIG. 2 is a cross-section of the regenerator taken along line 2—2 of FIG. 1.

Referring now to FIG. 1, cylindrical shell 1 constitutes the outer wall of the regeneration zone. Overlapping louvers 3 extend from the inlet end 4 of the regeneration zone to its outlet end 5. The louvers are supported by support members 6 which space them away from cylindrical shell and may be arranged as shown in the drawing so that the support members differ in length along the length of cylindrical shell 1 so that the louvers are farther away from the cylindrical shell near its inlet end and closer to the cylindrical shell at its outlet end with the result that the louvers slope downward from inlet end to outlet end. In an alternative arrangement, the cylindrical shell itself may slope downwardly from inlet end to outlet end and louvers can be equally spaced away from the cylindrical shell along their full length. Either arrangement provides a downward slope from inlet end to outlet end and both arrangements are included in the phrase "having its inlet end at a level above its outlet end." Spent catalyst feed is held in feed hopper 7 and is introduced into the regenerator so that the catalyst falls on the upper surface of louves 3 as it enters the regeneration unit. The feed rate introduction is controlled by valve means, not shown.

Fuel, normally natural gas, and an excess of air are introduced into furnace 8 and the resultant hot gaseous combustion product passes through line 9 into bottom space 10 between cylindrical shell 1 and louvers 3. The communication between line 9 and bottom space 10 is of a width such that gas is introduced into the passageways in bottom space 10 enclosed by longitudinal support members 6. The passageways into which the gas is introduced are indicated by letters $a$, $b$, $c$, $d$, $e$ and $f$, shown in FIG. 2 of the drawings. As the cylindrical shell rotates clockwise, passageway $a$ moves out of communication with line 9 and passageway $g$ moves into communication with line 9. Usually four to six passageways are in communication with line 9 but the specific passageways in such communication change as the shell rotates. Cylindical shell 1 is slowly rotated, for example, by chain drive means 11, or by a circular gear mounted on the surface of cylindrical shell 1 and driven by a gear wheel. As cylindrical shell 1 is rotated clockwise as shown in FIG. 2, the spent catalyst feed which takes the form of a segment of a cylinder rides on the louver surfaces as the cylinder turns until catalyst particles reach more or less the angle of repose when they begin to fall back toward the bottom of the interior. During the course of rotation of the cylinders, the hot gas passes from the lower space between the louver supports 6 and the cylindrical wall and through the openings between the louvers and then through the mass of catalyst resting upon them. The combined effect of the rotation of the cylinder and the passage of the hot gas through the catalyst bed is to produce continuous but gentle roll-over of the catalyst mass and intimate contact of the gas with the catalyst. This movement of the catalyst particles constituting the mass pretty completely precludes the development of any stationary hot sots which could result in catalyst sintering and clinker formation. Adjustable vanes 13 are arranged around the circumference of the space enclosed by the louvers at the outlet end of the regenerator. These vanes have a damming effect and can control the depth of the catalyst bed which rests on the louver surfaces and also contribute to control of catalyst residence time in the regeneration zone. Intermediate vanes may be set in the shell between inlet and outlet to provide increased residence time if desired.

Product catalyst is withdrawn from the outlet end of the regenerator through opening 14. Regeneration gas and gases formed during the course of the regeneration leave the outlet end of the regeneration zone and pass through line 15 into caustic scrubber 16 where acidic gases, particularly sulfur dioxide, are removed by the caustic solution and scrubbed gas is then released to the atmosphere through line 17.

The gases may, if desired, be withdrawn from the feed inlet end of the regeneration zone and piped to scrubber 16. Such withdrawal provides a degree of countercurrent contacting of catalyst and regeneration gas. Countercurrent contact may be further assisted by introducing the regenerating gas into space 10 at a point near the outlet end of the regeneration zone.

EXAMPLE I 9,250 Pounds of a spent catalyst comprising nickel and molybdenum supported on alumina which had accumulated carbon deposits amounting to 8.6 percent by weight of the catalyst and sulfur deposits between 7 and 8 percent by weight of the catalyst was regenerated in a regeneration system illustrated in FIG. 1. The regeneration zone was 30 feet in length and the cylindrical shell was rotated at a rate of 1 to 2 revolutions per minute during the regeneration.

Three passes of the catalyst charge through the regeneration zone were required to complete the regeneration. The first pass was made at relatively low temperature in order to remove sulfur from the catalyst without significant sulfation of the nickel and molybdenum metals which constituted the active catalytic material of the catalyst.

Before introducing catalyst into the regeneration zone, the gas/air mixture was burned in the furnace and the hot combustion gases were circulated through the regeneration zone to bring its temperature to about 800° F. Catalyst was then introduced into the regeneration zone at the rate of 2,200 pounds per hour and the gas/air ratio fed to the furnace was adjusted so that the outlet gas temperature was held in the range 650° to 680° F. during the first pass of the run. The first pass was completed in slightly over 4 hours. The average residence time of the catalyst in the regeneration zone was approximately 1 hour. During this pass, nearly all of the sulfur contained on the catalyst was removed and the carbon level of the catalyst was reduced to 6.3 percent.

The catalyst was then returned to the regeneration zone and fed to it at the same rate as that during the first pass. The average gas outlet temperature during this pass was 920° F., a temperature somewhat higher than that preferred, but control difficulties were encountered which permitted the outlet gas temperature to go above the preferred maximum of 900° F. Regeneration gas having an oxygen content of 16 percent by volume was introduced into the regeneration zone at a rate of 60,000 pounds per hour. The residence time during this second pass was also approximately 1 hour and at the end of this pass, separate samples of the catalyst showed carbon contents of 2.7 percent and 1.8 percent.

The catalyst was then returned to the regeneration zone for a third pass. During this pass, the average gas outlet temperature was 900° F. The residence time during this pass was again approximately 1 hour. Several determinations of the carbon content of the catalyst at the end of the third pass showed 0.32 percent, 0.36 percent and 0.01 percent. The sulfur content of the catalyst at the end of this pass was 0.1 percent. 7,700 Pounds of regenerated catalyst were recovered. The regenerated catalyst had an activity for hydrodesulfurization approximately 70 percent of that of fresh catalyst and an activity for hydrodenitrification of 65 percent of that of fresh catalyst. These relatively low activities are attributed in good part to the fact that the outlet gas temperature was permitted to rise above the preferred maximum of 900° F.

EXAMPLE II 21,000 Pounds of a desulfurization catalyst which was nickel and molybdenum supported on alumina and which had become inactivated by accumulation of coke on the catalyst surfaces during the course of use were regenerated. The sulfur content of this catalyst was relatively low so that no separate sulfur removal step was required. The catalyst was introduced into the regeneration zone at the rate of about 1,500 pounds per hour and regeneration gas having an oxygen content of about 16.5 percent by volume was introduced into the regeneration zone at a rate averaging about 65,000 pounds per hour. The gas/air mixture fed to the furnace was adjusted to maintain a gas outlet temperature which ranged from 640° to 800° F. during the first pass. Two passes were required to complete the regeneration and during the second pass the temperature of the outlet gas ranged from 780° to 825° F. Each pass of the catalyst through the regeneration zone required about 15 hours. The regenerated catalyst had a carbon content of 0.13 percent by weight and a desulfurization activity which was 90 percent that of fresh catalyst.

EXAMPLE III 30,000 Pounds of a nickel-tungsten on alumina catalyst which had become inactivated during use in desulfurization of light hydrocarbon streams were regenerated. The catalyst feed had a carbon content approximately 5 percent by weight. Two passes were required to complete the regeneration of the catalyst. The first pass was a desulfurization pass during which the temperature of the outlet gas was maintained in the range 550° to 600° F. The second pass was made to complete coke removal and during this pass, the outlet gas temperature was in the range 900° to 950° F.

During both passes, catalyst was introduced into the regeneration zone at the rate of 1,500 pounds per hour. During the desulfurization pass, the oxygen content of the regeneration gas was 17 percent by volume and the gas was introduced at a rate of about 60,000 pounds per hour. During the coke removal pass, the regeneration gas had an oxygen content of 15 percent by volume and was introduced into the regeneration zone at the rate of about 75,000 pounds per hour. Activity measurements for hydrodesulfurization were made on the regenerated catalyst and it was found to have between 95 and 98 percent of the activity of fresh catalyst.

The operation of the process requires attention to several variables which are discussed below.

The characteristics of the spent catalyst feed vary widely. The coke content of the catalyst may vary from 3 or 5 percent by weight up to as much as 20 percent by weight. Similarly, the sulfur content of the spent catalyst may vary from 1 or 2 percent up to as much as 10 percent. Each spent catalyst feed must be analyzed for coke and sulfur contents. If the sulfur content is quite low, it may be desirable to omit a separate low temperature sulfur removal pass and simply subject the catalyst to process conditions adapted to remove the carbon. When sulfur content is high, a low temperature treating step in which the gas effluent from the regeneration zone is held below a maximum of about 700° F. is required in order to remove sulfur without substantial sulfation of the metal components of the catalyst. The required residence time of the catalyst in the regeneration zone varies with the character and content of the carbon deposit. Total residence time for carbon removal lies in the range 2 to 6 hours. Catalysts having coke levels from about 3 to 7 percent can be regenerated using a total residence time of about 2 hours while catalysts containing coke at levels from 12 to 20 percent by weight will ordinarily require a total residence time of 4 to 6 hours. In order to obtain the required total residence time, it may be necessary to pass the catalysts through the regenerator more than once unless the regeneration zone is very long. Since a single regenerator will be used in the processing of a variety of spent catalysts, it is generally practical and economical to build a regenerator that will provide a residence time of 1 to 3 hours in normal operation. The slope of the louvers is fixed in the regenerator and the rate of travel of the catalyst through the regenerator as it rotates is reasonably fixed, but residence time can be controlled to some degree by adjusting the position of outlet controlling vanes 13 shown in FIG. 1 of the drawings. Spent catalysts having coke levels below about 7 percent can be regenerated in such a generator in either one or two passes and the smaller proportion of spent catalyst feeds which have much higher coke levels may require as many as five passes through this type of regenerator to complete coke removal. Because of the differences in the content of the contaminants the feed catalyst, differences in the depth of penetration of the contaminants into the catalyst pores and variations in the organic content of the deposits total residence time is arrived at by inspections of the catalyst effluent from successive passes and determination whether the burn is sufficiently complete or whether an additional pass or passes are required.

The regeneration gas is ordinarily prepared by burning natural gas in a large excess of air. The temperature of the product combustion gas determines the quantity of excess air fed to the furnace. The quantity of excess air employed is greater when a low temperature combustion product is desired and smaller when a higher temperature combustion product is desired. The quantity of excess air, however, is such that the oxygen content of the combustion gas product will lie in the range 15 to 18 volume percent. The regeneration gas need not, however, be prepared by burning natural gas in an excess of a air but rather can be brought to desired temperature by burning fuel oil in an excess of air or by indirect heating. Where indirect heating is employed, air itself having an oxygen content about 21 percent is a suitable regenerating gas. In nearly all circumstances, however, burning natural gas in a large excess of air is a more economic method of preparing the regeneration gas.

The rate at which the regenerating gas is introduced into the regeneration zone is high. 15 to 75 pounds per hour of regenerating gas are introduced into the regeneration zone for each pound of catalyst resident in the regeneration zone. The high gas rate plus the rotation of the regeneration zone keep the catalyst in movement and prevent the development of hot spots during the regeneration.

The temperature maintained in the regeneration zone is an important process variable. The temperature is controlled by measuring the temperature of the gas leaving the regeneration zone. During a desulfurization pass, the temperature of the gas leaving the regeneration zone is controlled to stay below a maximum of 700° F. and is generally in the same range 600° to 650° F. Control is achieved by varying the natural gas/air ratio of the mixture fed to the furnace in which the natural gas is burned, the higher air/natural gas ratios resulting in lower temperatures and the lower air/natural gas ratios resulting in higher temperatures. After sulfur has been removed from the catalyst, if a sulfur removal step is necessary, the carbon is then burned from the catalyst and during the carbon burn, the temperature of the exit gas from the regeneration zone should be controlled to lie below a maximum of 900° F., desirably in the range 750° to 900° F. and preferably in the range 800° to 850° F. Temperatures up to about 900° F. may be employed without danger of a temperature run-away and regenerations may be carried out at temperatures above the preferred 850° F. and up to 900° F. without significant damage to the catalyst, but it is found that the activity of the regenerated catalysts tend to be lower when temperatures about 850° F. in the exit gas continue for any extended period of time.

The temperature of the gas leaving the regeneration zone is selected for process control rather than the temperature of the inlet gas because it gives an indication of the approximate maximum temperature which exits in the regenerator.

The arrangement of the regeneration zone, rotating as it does and having the hot gas passing from the louver openings through the catalyst supported on the louvers plus the high gas rates employed make possible the use of a oxygen-rich regeneration gas without hot spot or temperature excursion development so that contaminant removal is rapid.

The regeneration zone is rotated during the regeneration at relatively slow rates in the range ½ to about 5 r.p.m. Higher rates of rotation provide no operating advantage and tend to cause more catalyst loss due to fragmentation during the course of regeneration.

While the foregoing description and examples have been directed to catalyst regeneration, certain heat resistant solid adsorbents, in particular the molecular sieve zeolite adsorbents used in purification and separation of hydrocarbons, also become contaminated with carbonaceous deposits during use and lose selectivity. These adsorbents can be effectively regenerated by treating them as the catalysts of the examples were treated.

What is claimed is:
1. The method of regenerating hydrotreating catalysts, comprised of Group VIb, VIIb or VIII metals or mixtures thereof on a rugged support, which have become deactivated during use by an accumulation of carbonaceous deposits on the catalyst surfaces which comprises:
   a. passing the spent catalyst into a regeneration zone comprised of a slowly rotating elongated generally horizontal cylindrical shell having its inlet end at a level above its outlet end,
   b. supporting the catalyst in the regeneration zone on overlapping louvers which extend the length of the cylindrical shell and are affixed to the interior of the cylindrical shell,
   c. introducing hot gas having an oxygen content in the range about 14 to 21 percent by volume into the space at the bottom of the shell between the louvers and the shell so that it passes between the louvers and through the catalyst supported on the louvers,
   d. withdrawing both gas and catalyst from the space enclosed by the louvers, the catalyst being withdrawn at a rate adapted to maintain an average catalyst residence time of at least one hour in the regeneration zone,
   e. maintaining the rate of hot gas introduction at a level such that from 15 to 75 pounds per hour of hot gas are introduced into the regeneration zone for each pound of catalyst contained in the regeneration zone, and
   f. adjusting the temperature of the hot gas introduced into the regeneration zone so as to maintain a temperature in the range 600° to 900° F. in the gas withdrawn from the regeneration zone.
2. The method of regenerating hydrotreating catalysts, comprised of Groub VIb, VIIb or VIII metals or mixtures thereof on a rugged support, which have become deactivated by accumulation of carbonaceous deposits having a substantial sulfur content on the catalyst surfaces which comprises:
   a. passing the spent catalyst into a regeneration zone comprised of a slowly rotating elongated generally horizontal cylindrical shell having its inlet end at a level about its outlet end,
   b. supporting the catalyst in the regeneration zone on overlapping louvers which extend the length of the cylindrical shell and are affixed to the interior of the cylindrical shell,
   c. introducing hot gas having an oxygen content in the range about 14 to 21 percent by volume into the space at the bottom of the shell between the louvers and the shell so that it passes between the louvers and through the catalyst supported on the louvers,
   d. withdrawing both gas and catalyst from the space enclosed by the louvers, the catalyst being withdrawn at a rate adapted to maintain average catalyst residence time of at least 1 hour in the regeneration zone,
   e. maintaining the rate of hot gas introduction at a level such that from 15 to 75 pounds per hour of hot gas are introduced into the regeneration zone for each pound of catalyst contained in the regeneration zone,
   f. adjusting the temperature of the hot gas introduced into the regeneration zone so as to maintain a temperature in the range about 400° to 700° F. in the gas withdrawn from the regeneration zone, whereby essentially all of the sulfur and a portion of the carbon is removed from the catalyst surfaces,
   g. returning the catalyst withdrawn from the regeneration zone to the regeneration zone and subjecting it to steps (a) to (f), inclusive, with the provisos that the temperature of the hot gas introduced in repeated step (f) is adjusted so as to maintain a temperature in the range 700° to 900° F. in the gas withdrawn from the regeneration zone and that the residence time of the catalyst in the regeneration zone during this step is in the range 1 to 6 hours.

* * * * *